US012619827B2

(12) United States Patent     (10) Patent No.:   US 12,619,827 B2

Sabharwal et al.     (45) Date of Patent:     May 5, 2026

(54) SYSTEM AND METHOD FOR INTELLIGENT GENERATION OF PRIVILEGE LOGS

(71) Applicant: RELATIVITY ODA LLC, Chicago, IL (US)

(72) Inventors: Jasneet Singh Sabharwal, Vancouver (CA); Somya Anand, Vancouver (CA); Ayushi Dalmia, Vancouver (CA)

(73) Assignee: RELATIVITY ODA LLC, Chicago, IL (US)

( * ) Notice: Subject to any disclaimer, the term of this patent is extended or adjusted under 35 U.S.C. 154(b) by 312 days.

(21) Appl. No.: 18/131,815

(22) Filed: Apr. 6, 2023

(65) Prior Publication Data

US 2023/0325601 A1     Oct. 12, 2023

Related U.S. Application Data

(60) Provisional application No. 63/327,989, filed on Apr. 6, 2022.

(51) Int. Cl.

| | |
|---|---|
| *G06F 40/30* | (2020.01) |
| *G06F 3/04847* | (2022.01) |
| *G06F 40/40* | (2020.01) |
| *G06N 5/022* | (2023.01) |

(52) U.S. Cl.
CPC .......... *G06F 40/30* (2020.01); *G06F 3/04847* (2013.01); *G06F 40/40* (2020.01); *G06N 5/022* (2013.01)

(58) Field of Classification Search
CPC ...... G06F 40/30; G06F 3/04847; G06F 40/40; G06F 40/216; G06F 40/279; G06N 5/022; G06N 3/0475; G06N 20/10; G06N 3/09; G06N 7/01

See application file for complete search history.

(56) References Cited

U.S. PATENT DOCUMENTS

| | | | | |
|---|---|---|---|---|
| 10,402,641 | B1 * | 9/2019 | Dang .................... | G06F 16/353 |
| 10,909,157 | B2 * | 2/2021 | Paulus ................. | G06N 3/0455 |
| 2019/0392250 | A1 * | 12/2019 | Aggarwal .............. | G06N 20/00 |
| 2020/0401660 | A1 * | 12/2020 | Wilson ................. | G06F 40/216 |
| 2021/0264115 | A1 * | 8/2021 | Wang ..................... | G06F 16/26 |
| 2021/0326881 | A1 * | 10/2021 | Handelman ............. | G06F 40/30 |
| 2022/0036134 | A1 * | 2/2022 | Bali ........................ | G06V 30/41 |
| 2022/0058504 | A1 * | 2/2022 | Malhotra ................ | G06N 7/01 |
| 2022/0383190 | A1 * | 12/2022 | He ........................... | G06N 3/09 |

* cited by examiner

*Primary Examiner* — Andrew C Flanders
*Assistant Examiner* — Cameron Kenneth Young
(74) *Attorney, Agent, or Firm* — MARSHALL, GERSTEIN & BORUN LLP

(57) ABSTRACT

Systems, methods, and computer readable media for intelligent generation of a privilege log are provided. These techniques may include accessing a corpus of documents and applying an unsupervised machine learning model thereto to identify a plurality of topics. Using the identified topics, the techniques include associating a plurality of categories with the identified topics and executing a classifier training model to train classifiers corresponding to the categories. These classifiers are then applied to the corpus of documents to label the documents. Subsequently, the techniques automatically generate a privilege log based upon the labels applied to the documents by the classifiers.

14 Claims, 4 Drawing Sheets

START

ACCESS CORPUS OF DOCUMENTS    405

APPLY UNSUPERVISED MACHINE LEARNING MODEL
TO CORPUS OF DOCUMENTS TO IDENTIFY TOPICS    410

ASSOCIATE CATEGORIES WITH TOPICS    415

EXECUTE A CLASSIFIER TRAINING MODEL TO TRAIN
CLASSFIERS CORRESPONDING TO CATEGORIES    420

APPLY CLASSIFIERS TO CORPUS OF DOCUMENTS    425

GENERATE PRIVILIGE LOG BASED UPON APPLIED
CLASSIFIERS    430

END

SYSTEM AND METHOD FOR INTELLIGENT GENERATION OF PRIVILEGE LOGS

CROSS-REFERENCE TO RELATED APPLICATIONS

This application claims the benefit of U.S. Provisional Application 63/327,989, entitled "SYSTEM AND METHOD FOR INTELLIGENT GENERATION OF PRIVILEGE LOGS," filed on Apr. 6, 2022, the disclosure of which is hereby incorporated herein by reference.

FIELD OF THE DISCLOSURE

The present disclosure generally relates to the intelligent generation of privilege logs and, more specifically, to applying machine learning techniques to improve the accuracy of privilege logs generated for a corpus of documents.

BACKGROUND

In various applications, a need exists to identify a set of documents within a corpus of documents that are subject to one or more privilege rules. For example, during the discovery process for a litigation, a producing party is required to produce a corpus of documents that meets the discovery conditions. Within this corpus of documents, individual documents may be covered by one or more privileges, such as attorney-client privilege, attorney work product privilege, confidential data, and/or other types of privilege. Privileged documents need not be produced by the producing party. A privilege log is a document that indicates which documents are withheld from discovery and the particular reasoning why the document is subject to a privilege claim. This privilege log enables the requesting party to review the privilege claims made by the producing party.

In many discovery processes, the corpus of documents that meet the discovery request is voluminous, often exceeding millions of documents. Thus, manual review of the corpus of documents is often unable to produce a privilege log in a timely manner. Accordingly, automated techniques are often applied to identify the privileged documents without significantly delaying the legal process. With the introduction of automated processes, it is important to ensure that automated processes are applied in a manner that accurately reflects the privilege claims. As a result, there is a need to develop intelligent privilege log generation techniques that improve the ability of automated systems to accurately identify privileged documents within a corpus of documents, thereby improving the functionality of the automated privilege log generation computing system itself.

BRIEF SUMMARY

In one aspect, a computer-implemented method for intelligent generation of a privilege log is provided. The method includes (1) accessing, by one or more processors, a corpus of documents; (2) applying, by the one or more processors, an unsupervised machine learning model to the corpus of documents to identify a plurality of topics associated with the corpus of documents; (3) executing, by the one or more processors, a classifier training model to train a plurality of classifiers respectively corresponding to topics in the plurality of topics; (4) applying, by the one or more processors, the classifiers to documents in the corpus of documents; and (6) generating, by the one or more processors, a privilege log by applying a set of rules that utilizes the classifiers applied to documents in the corpus of documents.

In another aspect, a system for intelligent generation of a privilege log is provided. The system includes (i) one or more processors; (ii) a communication interface communicatively coupled to a document storage system storing a corpus of documents; and (iii) one or more memories storing non-transitory, computer-readable instructions. The instructions, when executed by the one or more processors, cause the system to (1) access, via the communication interface, the corpus of documents; (2) apply an unsupervised machine learning model to the corpus of documents to identify a plurality of topics associated with the corpus of documents; (3) execute a classifier training model to train a plurality of classifiers respectively corresponding to topics in the plurality of topics; (4) apply the classifiers to documents in the corpus of documents; and (5) generate a privilege log by applying a set of rules that utilizes the classifiers applied to documents in the corpus of documents.

In another aspect, a non-transitory computer-readable storage medium storing processor-executable instructions is provided. The instructions, when executed cause one or more processors to (1) access a corpus of documents; (2) apply an unsupervised machine learning model to the corpus of documents to identify a plurality of topics associated with the corpus of documents; (3) execute a classifier training model to train a plurality of classifiers respectively corresponding to topics in the plurality of topics; (4) apply the classifiers to documents in the corpus of documents; and (5) generate a privilege log by applying a set of rules that utilizes the classifiers applied to documents in the corpus of documents.

BRIEF DESCRIPTION OF THE DRAWINGS

FIG. 2 depicts an example privilege log produced by the disclosed techniques.

DETAILED DESCRIPTION

The embodiments described herein relate to, inter alia, the generation of a privilege log based on a corpus of electronic documents. The systems and techniques described herein may be used during an eDiscovery process that is part of a litigation. Although the present disclosure generally describes the techniques' application to the eDiscovery and/or litigation context, other applications are also possible. For example, the systems and techniques described herein may be used by a company or other entity to categorize and/or review its own archived electronic documents and/or for other purposes.

Generally, the corpus of documents described herein refers to a plurality of documents that meet one or more conditions, such as those specified by a discovery request. While the present description generally assumes that the documents are electronic documents, the instant techniques may still be applied to physical documents. For example, the physical document may be scanned into a computer system to produce an electronic equivalent document that is analyzed by applying the instant techniques. Additionally, while many examples of documents described herein are electronic communication documents, such as emails, text conversations, social media conversations, etc., the documents within the corpus of documents may be of any appropriate document type, such as image file, video file, audio file, spreadsheets, memorandums, reports, and/or other types of documents. For documents that aren't text based, the instant techniques may still be applied by applying optical character recognition (OCR) techniques, transcription techniques, and/or metadata analyses.

Figure 1:
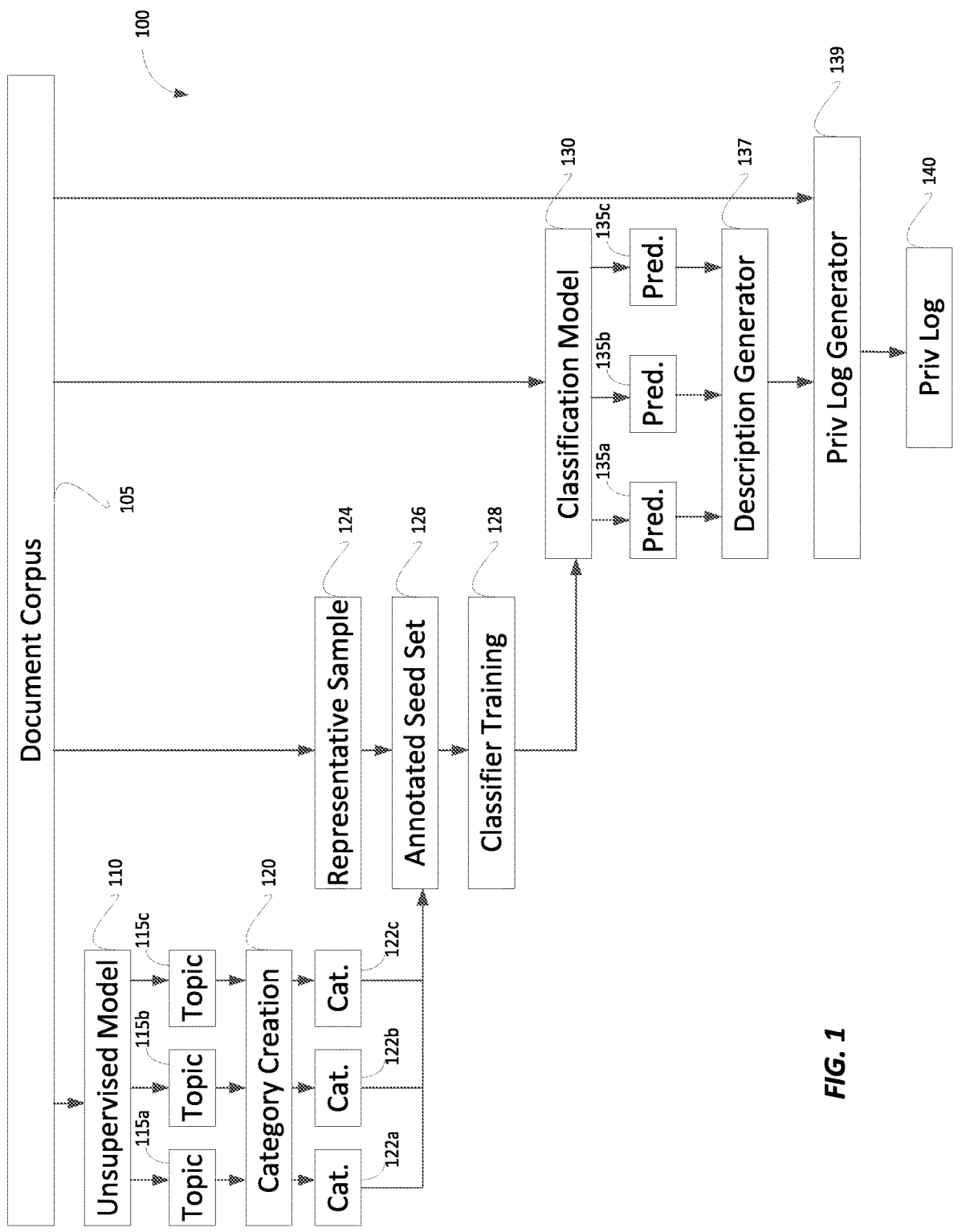
FIG. 1 depicts an example computing process in which a corpus of electronic communication documents is analyzed to produce a privilege log, according to one embodiment.

FIG. 1 depicts an example process 100 in which a privilege log 140 is produced based on a corpus of documents 105, according to one embodiment. The process 100 general involves multiple phases—(1) the application of an unsupervised machine learning model 110 to identify a topic set 115 and the corresponding categories 122; (2) the classifier training process 128 for the identified categories set using classifier training model 130; and (3) applying a privilege log generator 139 to the corpus of documents 105 to produce a privilege log 140, wherein the privilege log generator 139 implements the results of the classification model 130.

As will be described in more detail below, the various functionality described with respect to the process 100 may be performed by a computer system. For example, the computer system may be a cloud computing system or a server computing system installed on-premises. The computing system may be generally configured to perform various aspects of an eDiscovery process, including the instant techniques related to the automatic generation of privilege log.

For example, in some embodiments, prior to starting the process 100, the corpus of documents 105 are documents are ingested into a workspace supported by the computing system, such as Relativity®. As part of the ingestion process, the computing system may normalize documents by standardizing names, dates, times, and/or metadata, removing superfluous data such as disclaimers at the bottom of emails, and/or other applying other normalization techniques known in the art. As another aspect of the ingestion process, the computing system may apply one or more entity identification processes to identify and correlate particular entities (e.g., people, companies, etc.) referenced across the corpus of documents 105. For example, this process may correlate two references to the same entity made in two different documents in two different manners (such as by correlating "John Smith" and "John Q. Smith" as a reference to the same entity). As another example, the ingestion process may assign entities a role (e.g., attorney, outside counsel, in-house counsel, non-legal, etc.). As yet another example, if the document is a communication document, the ingestion process may append metadata indicating the entity that sent the document, the entities that received the document, and/or entities referenced within the document.

Additionally, to reduce the volume of documents in the corpus 105, the computing system may de-duplicate documents by removing multiple copies of the same document, applying electronic communication threading techniques, and/or other de-duplication techniques known in the art. Still further, the computing system may remove certain words from list of words included in each document to avoid their inclusion in the topic generation process (e.g., "the," "one," "a," etc.).

As illustrated, the computing system executes an unsupervised machine learning model 110 on the corpus of documents to identify a topic set 115. As described above, many of the documents within the corpus 105 are text-based documents. Accordingly, the unsupervised machine learning model 110 may be adapted to analyze the natural language content of each document. For example, the unsupervised machine learning model 110 may apply latent semantic analysis (LSA), probabilistic latent semantic analysis (pLSA), a latent Dirichlet analysis (LDA), a hierarchical analysis (such as hierarchical Dirichlet process (HDP)), and/or other semantic analysis algorithms. With particular respect to an LDA model, the unsupervised machine learning model 110 assumes that each document relates to one or more topics and each topic is identified based on the probability distribution of particular terms included in the document. The unsupervised machine learning model 110 forms the topic set by identifying clusters of terms in the various documents included in the corpus of documents 105. For example, a topic 115a that relates to "accounting" may include the terms "budget" "profit," and "loss" and a topic that relates to "legal" may include the terms "liability," "fraud," and "compliance." It should be appreciated that individual terms may be included in multiple topics. For example, the term "risk" may be included in both the "accounting" topic 115a and the "legal" topic 115b. That said, the distribution function for the term "risk" may vary between the different topics 115.

In some embodiments, the unsupervised machine learning model 110 may be a clustering model that is not specific to semantic analyses, such as a k-means clustering algorithm. In these embodiments, a topic may correspond to a cluster identified by the unsupervised machine learning model 110. Accordingly, the term "topic" may also relate to a mathematical relationship between semantic and/or non-semantic aspects of the document included in the corpus of documents 105. Regardless of the particular model implemented by the computing system, the application of the unsupervised machine learning model 110 to the corpus of documents results in the generation of topics 115a-115n that describe the documents in the corpus of documents 105. It should be appreciated that by applying the unsupervised machine learning model 110 to identify the topics in the topic set, the computing system is able to identify topics that may not be readily apparent upon manual review. Accordingly, the computing system is able to identify topics that more completely reflect the corpus of documents 105.

In some scenarios, the topic set 115 produced by the unsupervised machine learning model 110 includes more topics than needed to automatically generate the privilege log 140. Thus, to reduce the amount of computing resources and time spent training unneeded classifiers 125, the computing system may perform a reduction analysis of the topic set 115. Preferably, the topic set includes about 8-14 topics, but different scenarios may require a different number of topics to meet the needs of the particular request. In one example, the computing system generates a list of topics included in the topic set 115 for validation by a user (e.g., a representative of the producing party). To validate the accuracy of the topics included in the list of topics, the computing system may also include one or more example documents labeled with each topic. Accordingly, the computing system may compile the list of topics and the corresponding example documents for presentation to a user. In one example, the computing system presents 100-200 documents and their corresponding topic labels for validation. If the topic 115 set includes topics not relevant to the discovery request, the user may indicate that a particular topic should be removed from the topic set 115. On the other hand, if the user determines that a topic is missing from the topic set, the computing system may present a user interface that enables the user to indicate one or more documents that are related to the missing topic such that the computing system is able to identify the corresponding cluster produced by the unsupervised machine learning model and/or re-apply the unsupervised machine learning model 110 to generate a cluster of documents that corresponds to the missing topic.

Additionally, the user interface may enable the user to specify one or more rules associated with each topic. These rules may be based on the content of the document and/or the metadata associated with the document. Content-based rules may specify that documents within the topic must include particular terms or entities (e.g., a particular entity identified during the ingestion process). On the other hand, metadata-based rules may specify a date range of the document creation/modification, an entity that created the document, an entity that received the document, etc. Accordingly, the number of documents that satisfy the topic rules is typically fewer than the number of documents labeled with the topic by the unsupervised machine learning model 110. In some embodiments, the computing system generates a catch-all or default topic for documents that don't meet the requirements of the explicit topics, but are nonetheless relevant to the discovery request.

After finalizing the topics included in the topic set 115, the computing system may implement a category creation process 120 to generate one or more categories 122 that are used to annotate documents within the corpus 105. The categories may correspond to a particular reason why a document is associated with a privilege claim (e.g., legal advice, attorney communication, etc.) and/or any other category associated with the classification problem being solved by the disclosed techniques. Generally, the categories should be defined such that each category has a minimum number of documents to ensure that there is sufficient training data to train the corresponding classifiers.

To validate the category definitions within the category set 122, the computing system may be configured to apply the category set 122 to a seed set and analyze characteristics of the annotated seed set to ensure that accuracy of the category set 122.

Accordingly, the computing system may first generate a seed set of documents 124 representative of the corpus 105. The computing system may select documents for inclusion in the seed set from the corpus of documents 105. In some embodiments, the computing system applies stratified sampling techniques to ensure sufficient diversity from amongst the topics included in the topic set 115 within the seed set. Additionally or alternatively, the computing system may apply LDA techniques to deduplicate semantically-similar documents from the seed set, thereby ensure a diversity of semantic representations in the seed set. The number of documents selected by the computing system may vary proportionally with the number of topics in the topic set 115. In some embodiments, the computing system may perform one or more de-duplication techniques to ensure that each document in the seed set is sufficiently different from other documents in the seed set (e.g., including on a single document representative of an email exchange). Additionally, the computing system may ensure that documents that include little content (e.g., below a threshold number of terms or topics associated therewith) are excluded from the seed set.

The computing system may then present the documents included in the seed set for manual annotation for the categories included in the category set 122. For example, the documents included in the seed set 124 may be presented via a document review software module executing on the computing system. In some embodiments, these manual annotations may subsequently act as the truth when validating a classifier that is trained using the techniques disclosed herein. Accordingly, in these embodiments, the seed set may be included in a validation document set to validate that a classifier 125 meets a threshold performance metric (e.g., precision, recall, accuracy, etc.). Additionally or alternatively, the computing system may identify another set of documents from the corpus 105 to be the validation set for the trained classifier(s).

The computing system may also analyze the manual annotations to validate the category set 122. For example, the computing system may ensure that each category includes a threshold number of documents (e.g., 25, 50, 100, etc.). If a category does not include the threshold number of documents, the category may be removed from the category set 122 and/or merged with another category in the category set 122. As another example, the computing system may determine that two or more category have a threshold amount of overlap. In response, the computing system may merge these categories within the category set 122.

After validating the categories within the category set 122, the computing system trains one or more classifier 128 of a classification model 130. In some embodiments, the classification model 130 includes a multi-class classifier 128 trained to apply one or more labels corresponding to any number of the categories included in the category set 122. Additionally or alternatively, the classification model 130 may include single class classifiers 128 trained to apply a label associated with an individual category within the category set 122. To train the classifier(s) 128, the computing system may extract features of the documents using a support vector machine (SVM) analysis, a fastText analysis, a term frequency-inverse document frequency (TF-IDF) analysis, a bag of words analysis, an xgboost analysis, a deep learning analysis (e.g., using word2vec embeddings, bidirectional encoder representation from transformer (BERT)-based embeddings, or other embedding techniques), and/or other feature extraction techniques. Additionally, the computing system may determine similarity between the extracted features by applying a logistic regression analysis, a cosine similarity analysis, and/or other known types of similarity analyses. In some embodiments, the classifiers 128 may be viewed as a hyperplane in a multi-dimensional feature space that bisects the feature space into a first region that includes documents that satisfy the topic criteria and a second region that includes documents that do not satisfy the topic criteria.

It should be appreciated that, in many scenarios, there isn't one classifier 128 that provides the best performance across all categories included in the category set 122. Accordingly, to improve the performance of the computing system, the computing system may apply multiple different embedding techniques and/or similarity analyses to the annotated seed set 126 for each category in the category set 122. The computing system may then generate a performance metric (e.g., precision, recall, accuracy, etc.) for each classifier 128 for a given category 122 and select the classifier 128 that exhibits the best performance with respect to the performance metric. As a result, the classifier 128 corresponding to the category 122*a* may embed documents using a word2vec feature extraction technique and the classifier 128 corresponding to the category 122*b* may embed documents using a SVM feature extraction technique. Thus, the computing system is able to more accurately apply category labels to unlabeled documents than if the same embedding technique is used to train each classifier 128. The computing system may then use the selected classifier 128 when applying the category label to the unlabeled documents in the corpus of documents 105 (i.e., the documents not included in the manually annotated seed set of documents).

Additionally, the classifier(s) 128 may also not exhibit equal performance across all document types (e.g., text documents, spreadsheets, image files, etc.). Accordingly, the computing system may also train multiple classifiers 128 for a given category to separately classify documents of different types. In these embodiments, when the computing system generates the performance metric for each classifier 128 for a given category 122, the computing system may generate a performance metric for each classifier 128 as applied to each document type. In embodiments that use multi-class classifiers, the multi-class classifier may account for the different file types within the classifier itself.

After training the classifiers 128 that form the classification model 130, the computing system may input the remaining documents of the corpus 105 into the classification model 130 to generate predictions 135 as to whether each document within the corpus 105 should be labeled with a label corresponding to each category in the category set 122. It should be appreciated that any individual document can be labeled with any number of categories included in the category set 122.

As illustrated, after the documents are labeled, a description generator 137 may then analyze the category labels applied to the documents to generate a description of why the document is privileged. In some embodiments, the description generator 137 may include rules that standardize the description for each document. For example, the rules may be an XML template that inserts the appropriate text based on an analysis of the document's metadata (including any labels applied thereto by the classification model 130 and/or an any entities associated therewith during ingestion).

In other embodiments, a generative artificial intelligence (AI) model may be applied to generate the description. In these embodiments, the generative AI model may be tuned based upon to the topic set 115, the category set 122, and/or manually provided reasoning for the privilege claim provided during manual annotation of the seed set 124 to understand the features of the documents included in the corpus 105 that result in the document being included in the privilege log 140. Accordingly, the generative AI model may be configured to output a natural language description of the basis for the privilege claim in response to receiving an input of a labeled document.

Figure 2:
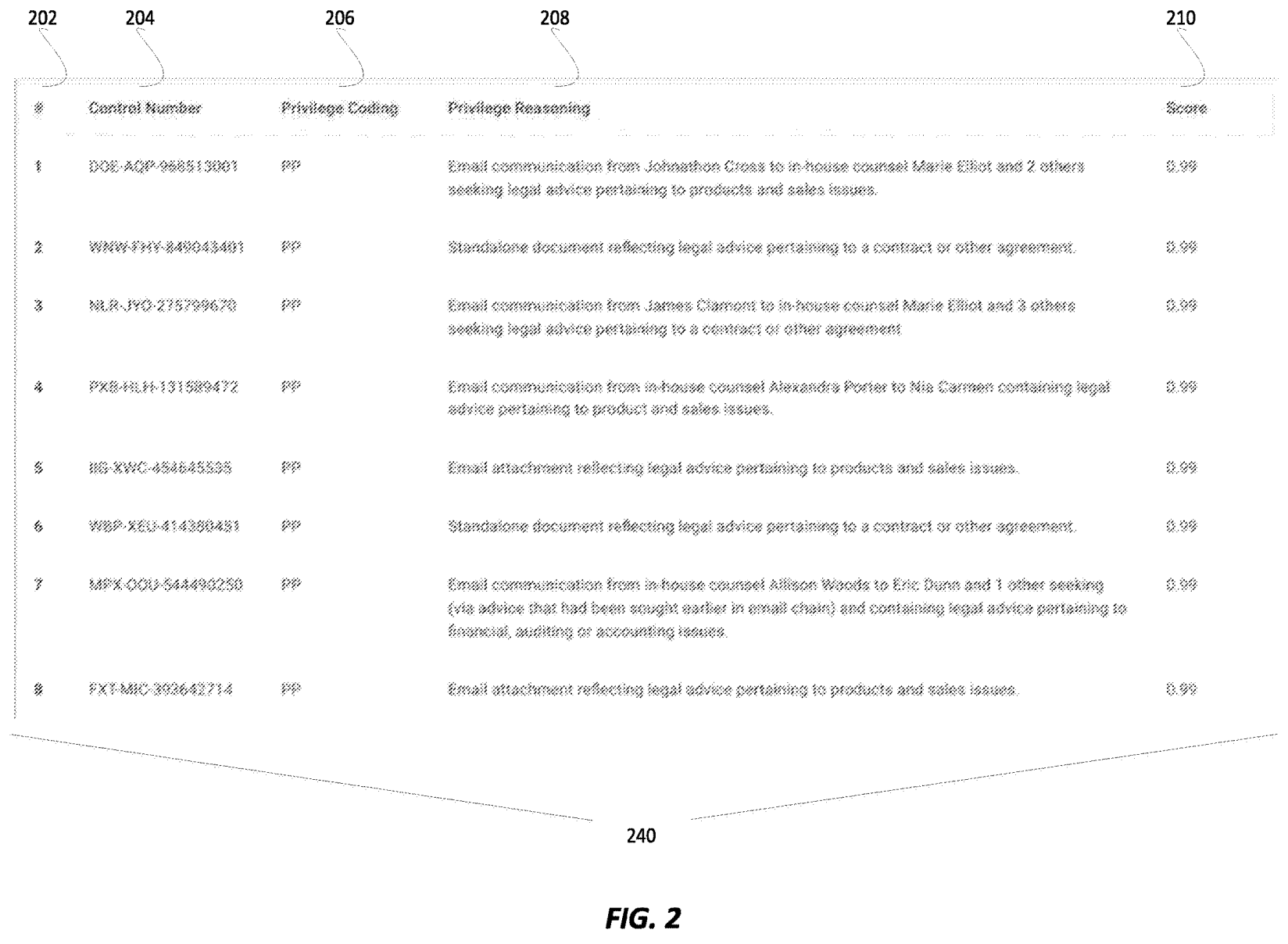

The computing system may then execute a privilege log generator 139 to compile the documents and the corresponding outputs of the description generator into a privilege log 140 With simultaneous to FIG. 2, illustrated is an example privilege log 240 (such as the privilege log 140 of FIG. 1) generated by applying a privilege log generator (such as the privilege log generator 139 of FIG. 1) to a labeled corpus of documents. As illustrated, the privilege log 240 is a document that indicates which documents in the corpus of documents that are subject to a privilege claim and the reasoning for the privilege claim. Accordingly, the privilege log 240 includes columns that identify the document and columns that describe the reasoning for to privilege claim.

It should be appreciated that illustrated privilege log 240 is only one example of how a privilege log may be organized. In other embodiments, the description generator 137 may produce a privilege log that has different columns, different column ordering, and/or other modifications to meet the privilege log needs for the producing party. For example, emails within the same email thread may be assigned a family number as part of an email threading process performed during document ingestion. Accordingly, an alternate privilege log may include a column that indicates the document family number. As other examples, additional columns may include attorneys associated with the document, whether the attorney is an in-house or external attorney, a date, a sender, a recipient list, and/or other types of metadata associated with the document.

In the illustrated privilege log 240, the first column 202 is a document number that identifies the document number with respect to the privilege log 240 and the second column 204 is a control number 204 that identifies the document within the corpus of documents. The control number 204 may utilize any standard control number format used in the eDiscovery context (e.g., a Bates number, a hash value, etc.). Column 206 indicates the type of privilege asserted for the particular document. For example, the illustrated coding of "PP" may relate to attorney-client privilege. Accordingly, the description generator 137 may include a rule that identifies the particular type of privilege (e.g., by identifying a category label associated with attorney-client privilege).

Turning to column 208 ("Privilege Reasoning"), the privilege log 240 provides an indication for why the computing system determined that a particular document is privileged. The reasoning may an output of the description generator 137. Accordingly, the reasoning may be provided based upon a set of rules and/or by a generative AI model.

In the illustrated example, each reasoning starts with an identification of the document type ("email communication", "standalone document," "email attachment," etc.). The document type determination may be based upon an analysis of the file type and/or file extension for the document. For communication documents, document is followed by the sender of the communication document (e.g., the entity corresponding to the "from:" metadata field) and the recipients of the communication document (e.g., the entities corresponding to the "to:" metadata field). If the communication document includes multiple recipients, the description generator 137 may prioritize the inclusion of entities that are specifically identified in a topic rule for the corresponding topic over entities that are not.

After the document type (and any sender/recipient information), the reasoning description then indicates the categories 122 that led the inclusion of the document in the privilege log 240. For example, the first document is labeled with both a "legal advice" label and a "products and sales issues" label. That is, for example, a classification model (such as the classification model 130 of FIG. 1) applied a "legal advice" label and a "products and sales issues" label to the document. Similarly, in the illustrated example, the second document is labeled with a "legal advice" label and a "contract or other agreement" label. It should be appreciated that it is the "legal advice" label that led to inclusion of the document in the privilege log 140, whereas the "products and sales issues" and "contract or other agreement" topics are included to provide context to the type of legal advice. Accordingly, the description generator 137 may prioritize different labels such that higher priority labels (e.g., the labels upon which a privilege claim is based) appear before lower priority labels (e.g., the labels that provide context) in the reasoning column 208.

In the illustrated example, the last column 210 reflects a confidence score that the document is accurate assigned the labels assigned thereto. The confidence score may be determined using any known means for generating a confidence score associated with the classification model 130. For example, the confidence score may represent a distance of the particular document from the hyperplane in the contextual space corresponding to the applied classifiers. In some embodiments, the score reflects the confidence in the label applied to the document by the higher priority classifier (e.g., the label that is the basis of the privilege claim). In other embodiments, the score that combines the confidence value in each classifier that applied a label to the document. In these embodiments, the score may weight the higher priority topic classifier higher than the lower priority topic classifiers. It should be appreciated that in other embodiments the confidence score is not included in the privilege log.

It should be appreciated that while FIG. 2 only illustrates eight documents, the computing system may apply the classification model 130 to each document in the corpus of documents 105. After applying the rules, the computing system may then sort the documents based on a confidence score, such as the score indicated in column 210. In some embodiments, the privilege log generator 139 may include a threshold confidence score (e.g., 0.9, 0.95, 0.98) for inclusion in the privilege log 140. Accordingly, the privilege log 140 may only include documents that meet the threshold confidence score. In different embodiments that include additional or alternate columns to those depicted in FIG. 2, the computing system may perform the appropriate analysis corresponding to that column.

Figure 3:
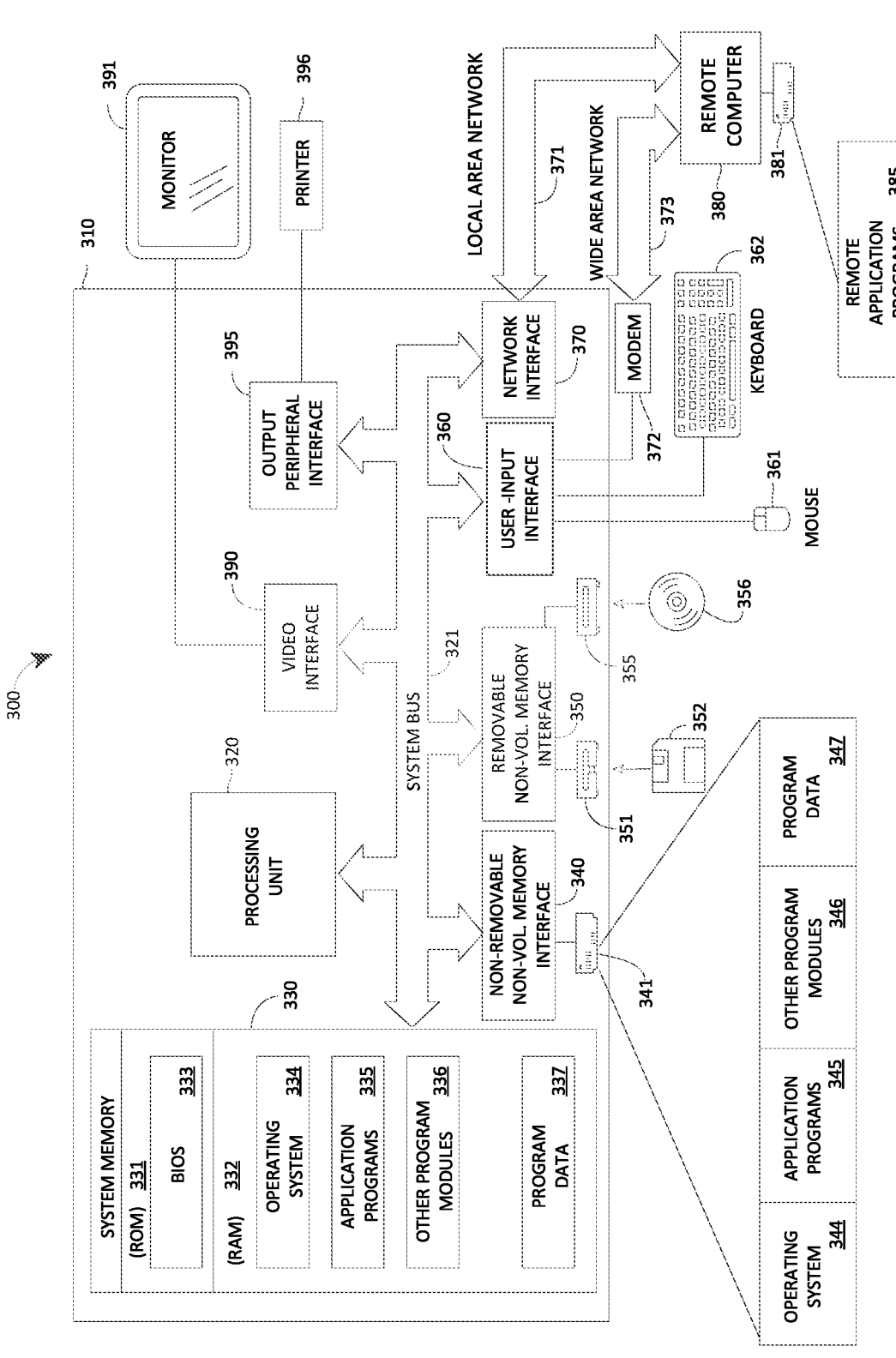
FIG. 3 depicts an example computing system in which the techniques described herein may be implemented, according to one embodiment.

Turning now to FIG. 3, FIG. 3 depicts an example computing system 300 in which the techniques described herein may be implemented, according to an embodiment. For example, the computing system 300 of FIG. 3 may be the computing system configured to perform the process 100 described with respect to FIGS. 1 and 2. The computing system 300 may include a computer 310. Components of the computer 310 may include, but are not limited to, a processing unit 320, a system memory 330, and a system bus 321 that couples various system components including the system memory 330 to the processing unit 320. In some embodiments, the processing unit 320 may include one or more parallel processing units capable of processing data in parallel with one another. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 may include a variety of computer-readable media. Computer-readable media may be any available media that can be accessed by computer 310 and may include both volatile and nonvolatile media, and both removable and non-removable media. By way of example, and not limitation, computer-readable media may comprise computer storage media and communication media. Computer storage media may include volatile and nonvolatile, removable and non-removable media implemented in any method or technology for storage of information such as computer-readable instructions, data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310.

Communication media typically embodies computer-readable instructions, data structures, program modules or other data in a modulated data signal such as a carrier wave or other transport mechanism, and may include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to, and/or presently being operated on, by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 3 provide storage of computer-readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device is also connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and may include many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 may include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 3 illustrates remote application programs 385 as residing on memory device 381.

The techniques for automatically generating a privilege log based upon a corpus of documents described above may be implemented in part or in their entirety within a computing system such as the computing system 300 illustrated in FIG. 3. In some embodiments, the computing system 300 is a server computing system communicatively coupled to a local workstation (e.g., a remote computer 380) via which a user interfaces with the computing the computing system 300. For example, the computer 310 may be configured to send documents from a corpus of documents to the local workstation for presentation thereat by a document review application in order to receive the manual annotations of topic labels for topics included in a topic set. As another example, the computer 310 may be configured to communicate with the local workstation to present a user interface via which a user is able to modify topics included in a topic set and/or provide rules related to topics included in the topic set.

In some embodiments, the computing system 300 may include any number of computers 310 configured in a cloud or distributed computing arrangement. Accordingly, the computing system 300 may include cloud computing manager system (not depicted) that efficiently distributes the performance of the functions described herein between the computers 310 based on, for example, a resource availability of the respective processing units 320 or system memories 330 of the computers 310. In these embodiments, the documents in the corpus of documents may be stored in a cloud or distributed storage system (not depicted) accessible via the interfaces 371 or 373. Accordingly, the computer 310 may communicate with the cloud storage system to access the documents within the corpus of documents, for example, when applying an unsupervised machine learning model and/or a classifier training model to documents maintained thereat.

Figure 4:
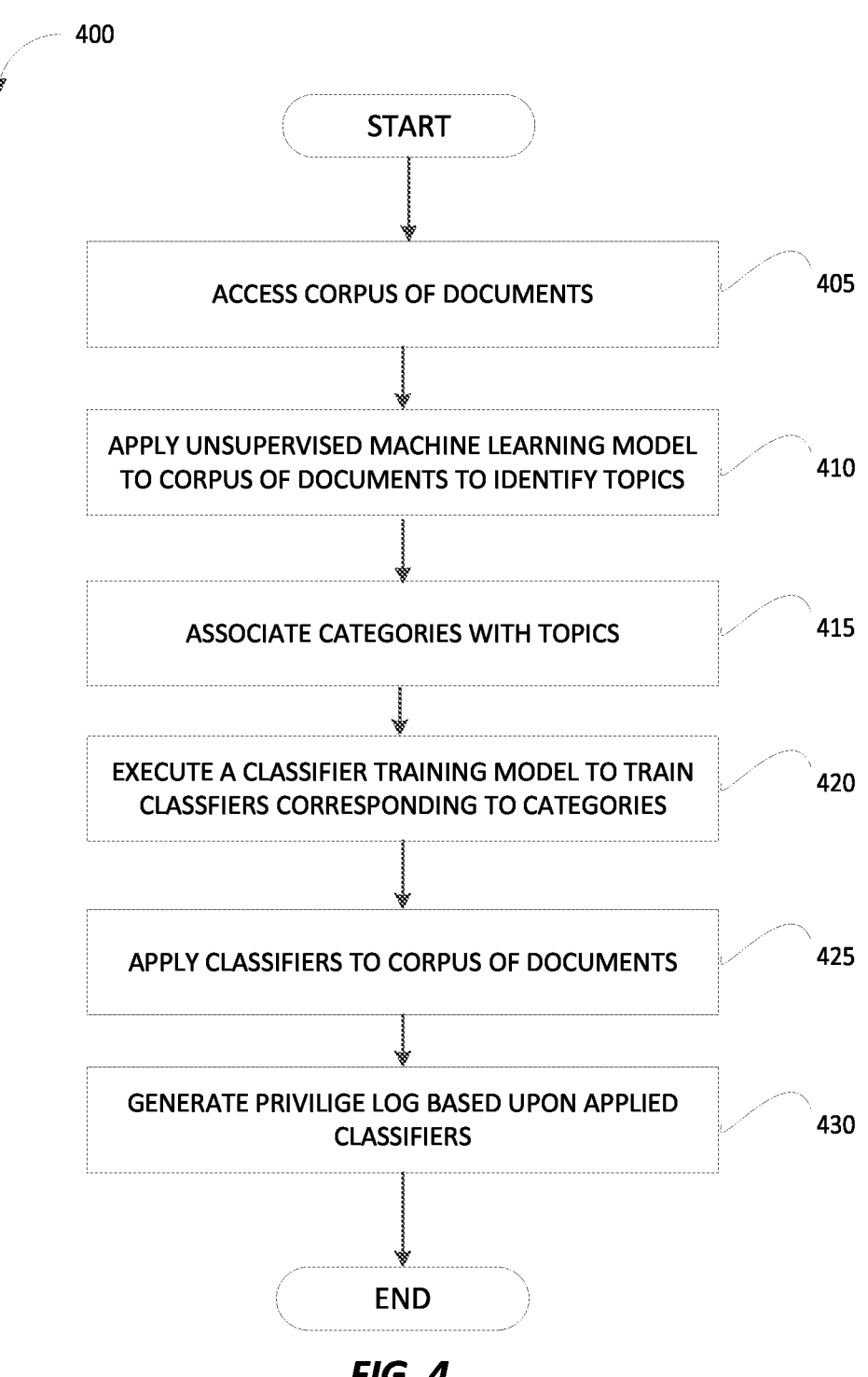
FIG. 4 depicts a flow diagram of an example method for intelligent generation of a privilege log, according to one embodiment.

FIG. 4 depicts a flow diagram of an example method 400 for intelligent generation of a privilege log in accordance with the techniques described herein. The method 400 may be implemented by one or more processors of one or more computing devices, such as the staging platform 300 of FIG. 3, for example.

The method 400 may begin when the computing system accesses a corpus of documents, such as the corpus 105 of FIG. 1 (block 405). In some embodiments, the corpus of documents is ingested into a cloud storage system at which the corpus of documents is accessed. In some embodiments, the computing system obtains documents from the cloud storage system for temporary storage in a working memory (such as the memory 340 of FIG. 3) while performing the disclosed actions thereon. After the computing system modifies a document and/or the metadata associated therewith, the computing system may update the copy of the document maintained at the cloud storage system.

At block 410, the computing system applies an unsupervised machine learning model to the corpus of documents to identify a plurality of topics (such as the topics 115 of FIG. 1) associated with the corpus of documents. For example, the unsupervised machine learning model may be the unsupervised machine learning model 110 of FIG. 1. By executing the unsupervised machine learning model, the computing system may generate a conceptual space based on one or more features of the documents. In some embodiments, the computing system generates the conceptual space by performing a feature reduction analysis to reduce the number of dimensions associated with the unsupervised machine learning model to, for example, two dimensions. The computing system may then identify topics by identifying a cluster in the conceptual space. In some embodiments, the computing system may determine that a first cluster and a second cluster exhibit a threshold amount of overlap (e.g., as determined by a number of documents in both clusters and/or by an amount of overlap area in the conceptual space). Accordingly, the computing system may combine the clusters by corresponding a topic of the plurality of topics to both of the first cluster and the second cluster.

At block 415, the computing system associates a plurality of categories with respective subsets of the plurality of topics. In some embodiments, the computing system may present a user interface that enables a user to (i) modify the categories included in the plurality of categories and/or (ii) define a rule that documents must satisfy to be associated with the category. In some embodiments, the computing system presents the user interface by transmitting data to populate a user interface displayed at a local workstation computer. For example, the user may manually remove categories from the plurality of categories via the user interface.

At block 420, the computing system executes a classifier training model (such as the classifier training models 120 of FIG. 1) to train a plurality of classifiers (such as the classifiers 125 of FIG. 1) respectively corresponding to categories in the plurality of categories. It should be appreciated that the classifiers may be single classifiers trained to determine whether or not a single topic label should be applied to a document, or a multi-class classifier trained to determine whether any number of topic labels should be applied to a document. For example, the computing system may execute a classifier training model based on a SVM analysis, a TF-IDF analysis, a fastText analysis, an xgboost analysis, a deep learning analysis (e.g., using word2vec embeddings, bidirectional encoder representation from transformer (BERT)-based embeddings, or other embedding techniques), etc. To execute the classifier training model, the computing system may first generate a seed set of documents from the corpus of documents, wherein the seed set of documents include a threshold number of documents associated with each topic in the topic set. Accordingly, the computing system may execute the classifier training model using the seed set of documents.

As described above, different classifier training models may exhibit different performance across the different categories. Accordingly, in some embodiments, the computing system executes multiple different classifier training models for each category. That is, the computing system may execute a first classifier training learning model to train a first classifier for a particular category and execute a second classifier training model to train a second classifier for the particular category. The computing system may then evaluate the classifier training models by generating a performance metric (e.g., accuracy, precision, recall, etc.) for the first and second classifier training models. Thus, in some embodiments, the computing system may detect that the performance metric for the first classifier for the particular category is greater than the performance metric for the second classifier for the particular category and select the first classifier for the category to be the classifier corresponding to the category.

Similarly, as described above, the different classifier training models may exhibit different performance across document types (e.g., text document, image files, spreadsheets, etc.). Accordingly, the computing system may also be configured to determine the performance metric for each classifier training model with respect to a first file type and a second file type. In embodiments that use multi-class classifiers, the multi-class classifier may account for the different file types within the classifier itself. In some embodiments, the computing system may detect that, for the first file type, the performance metric for the first classifier for the category is greater than the performance metric for the second classifier for the category and that, for the second file type, the performance metric for the second classifier for the category is greater than the performance metric for the first classifier for the category. In these embodiments, the computing system may then select the first classifier to use with documents of the first file type within the particular category and the second classifier to use with documents of the second file type within the particular category.

At block 425, the computing system applies the classifiers to documents in the corpus of documents. In some embodiments, the computing system more particularly applies the selected classifiers for a particular category to the documents within the corpus of documents not included in the seed set of documents. It should be appreciated that in some embodiments, a single multi-class classifier may be utilized to apply each of the topic labels included in the topic set. By applying the classifiers to the corpus of documents, the computing system labels the documents with labels indicative of the applicable categories to which the document belongs.

At block 430, the computing system generates a privilege log (such as the privilege logs 140 and 240 of FIGS. 1 and 2, respectively) based upon the classifiers as applied to documents in the corpus of documents (e.g., by using the classification model 130 of FIG. 1). In some embodiments, the classification model includes rules that are defined using a customizable logic-based protocol, such as XML. In some embodiments, the rules include a rule that indicates reasoning as to why a document is subject to a privilege claim based on topic labels applied by the one or more classifiers. As described with respect to FIG. 2, the rules may also include rules that define how to present textual reasoning that provides the basis of the privilege claim. In other embodiments, the computing system may apply generative natural language AI to classify the documents and/or generate reasoning for the classification.

It should be appreciated that while the method 400 specifically relates to the automatic generation of a privilege log, the techniques described with respect to blocks 405-425 may be applied to the corpus of documents to apply labels to documents in the corpus of documents related to other contexts (such as confidentiality analysis, detection of intellectual property rights, data categorization, etc.). Accordingly, in other embodiments, the set of rules may include logic that enables the automatic generation of a document particular to the respective context. Thus, the same improvements in the accuracy with which a corpus of documents is automatically labeled using classifiers trained by the instant techniques can also be achieved in these contexts.

Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for identifying and grouping likely textual near-duplicates through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for intelligent generation of a privilege log, the method comprising:

accessing, by one or more processors, a corpus of documents, wherein the corpus of documents includes a first type of document and a second type of document;

applying, by the one or more processors, an unsupervised machine learning model to the corpus of documents to identify a plurality of topics associated with the corpus of documents;

associating, by the one or more processors, a plurality of categories with respective subsets of the plurality of topics;

executing, by the one or more processors, a classifier training model to train a plurality of classifiers corresponding to the plurality of categories, wherein executing the classifier training model to train a classifier corresponding to a category comprises executing a first classifier training model to train a first classifier for the category; and executing a second classifier training model to train a second classifier for the category;

detecting, by the one or more processors, that, for the first type of document, a performance metric for the first classifier for the category is greater than the performance metric for the second classifier for the category;

detecting, by the one or more processors, that, for the second type of document, the performance metric for the second classifier for the category is greater than the performance metric for the first classifier for the category;

applying, by the one or more processors, the first classifier for the category to documents of the first type of document;

applying, by the one or more processors, the second classifier for the category to documents of the second type of document; and generating, by the one or more processors, a privilege log based upon the classifiers applied to documents in the corpus of documents.

2. The computer-implemented method of claim 1, wherein identifying a topic of the plurality of topics comprises:

identifying, by the one or more processors, a cluster in a conceptual space generated by the unsupervised machine learning model.

3. The computer-implemented method of claim 2, further comprising:

determining, by the one or more processors, that a first cluster and a second cluster exhibit a threshold amount of overlap; and corresponding, by the one or more processors, the topic of the plurality of topics to both of the first cluster and the second cluster.

4. The computer-implemented method of claim 1, further comprising:

detecting, by the one or more processors, that a performance metric for the first classifier for the category is greater than a performance metric for the second classifier for the category; and selecting, by the one or more processors, the first classifier for the category to be the classifier corresponding to the category.

5. The computer-implemented method of claim 1, further comprising:

presenting, by the one or more processors, a user interface that enables a user to (i) modify the categories included in the plurality of categories and/or (ii) define a rule that documents must satisfy to be associated with the category.

6. The computer-implemented method of claim 1, wherein executing the classifier training model to train the plurality of classifiers comprises:

generating, by the one or more processors, a seed set of documents from the corpus of documents, wherein the seed set of documents include a threshold number of documents associated with each topic in the plurality of topics; and executing, by the one or more processors, the classifier training model on the seed set of documents.

7. The computer-implemented method of claim 1, wherein generating the privilege log comprises:

inputting, by the one or more processors, a labeled document into a generative artificial intelligence model to generate a natural language description associated with the labeled document's inclusion in the privilege log.

8. A system for intelligent generation of a privilege log, the system comprising:

one or more processors;

a communication interface communicatively coupled to a document storage system storing a corpus of documents; and one or more memories storing non-transitory, computer-readable instructions that, when executed by the one or more processors, cause the system to:

access, via the communication interface, the corpus of documents, wherein the corpus of documents includes a first type of document and a second type of document;

apply an unsupervised machine learning model to the corpus of documents to identify a plurality of topics associated with the corpus of documents;

associate a plurality of categories with respective subsets of the plurality of topics;

execute a classifier training model to train a plurality of classifiers respectively corresponding to categories in the plurality of categories, wherein to execute the classifier training model to train a classifier corresponding to a category comprises executing a first classifier training model to train a first classifier for the category and executing a second classifier training model to train a second classifier for the category;

detect that, for the first type of document, a performance metric for the first classifier for the category is greater than the performance metric for the second classifier for the category;

detect that, for the second type of document, the performance metric for the second classifier for the category is greater than the performance metric for the first classifier for the category;

apply the first classifier for the category to documents that are the first type of document;

apply the second classifier for the category to documents that are the second type of document; and generate a privilege log based upon the classifiers applied to documents in the corpus of documents.

9. The system of claim 8, wherein to identify a topic of the plurality of topics, the instructions, when executed, cause the system to:

identify a cluster in a conceptual space generated by the unsupervised machine learning model.

10. The system of claim 9, wherein the instructions, when executed, cause the system to:

determine that a first cluster and a second cluster exhibit a threshold amount of overlap; and correspond the topic of the plurality of topics to both of the first cluster and the second cluster.

11. The system of claim 8, wherein the instructions, when executed, cause the system to:

detect that a performance metric for the first classifier for the category is greater than a performance metric for the second classifier for the category; and select the first classifier for the category to be the classifier corresponding to the category.

12. The system of claim 8, wherein to execute the classifier training model to train the plurality of classifiers, the instructions, when executed, cause the system to:

generate a seed set of documents from the corpus of documents, wherein the seed set of documents include a threshold number of documents associated with each topic in the plurality of topics; and execute the classifier training model on the seed set of documents.

13. The system of claim 8, wherein to generate the privilege log, the instructions, when executed, cause the system to:

input a labeled document into a generative artificial intelligence model to generate a natural language description associated with the labeled document's inclusion in the privilege log.

14. A non-transitory computer-readable storage medium storing processor-executable instructions, that when executed cause one or more processors to:

access a corpus of documents, wherein the corpus of documents includes a first type of document and a second type of document;

apply an unsupervised machine learning model to the corpus of documents to identify a plurality of topics associated with the corpus of documents;

execute a classifier training model to train a plurality of classifiers respectively corresponding to topics in the plurality of topics, wherein executing the classifier training model to train a classifier corresponding to a category comprises executing a first classifier training model to train a first classifier for the category and executing a second classifier training model to train a second classifier for the category;

detect that, for the first type of document, a performance metric for the first classifier for the category is greater than the performance metric for the second classifier for the category;

detect that, for the second type of document, the performance metric for the second classifier for the category is greater than the performance metric for the first classifier for the category;

apply the first classifier for the category to documents that are the first type of document;

apply the second classifier for the category to documents that are the second type of document; and generate a privilege log by applying a set of rules that utilizes the classifiers applied to documents in the corpus of documents.

\* \* \* \* \*